Sept. 17, 1957 R. R. WINGERT 2,806,945

TELEVISION RECEIVER

Filed July 1, 1953

INVENTOR.
Raymond R. Wingert
BY Norman L. Mueller
Attys.

2,806,945

TELEVISION RECEIVER

Raymond R. Wingert, Chicago, Ill., assignor to Motorola, Inc., Chicago, Ill., a corporation of Illinois Application July 1, 1953, Serial No. 365,498
5 Claims. (Cl. 250—20)

Figures 1, 2:
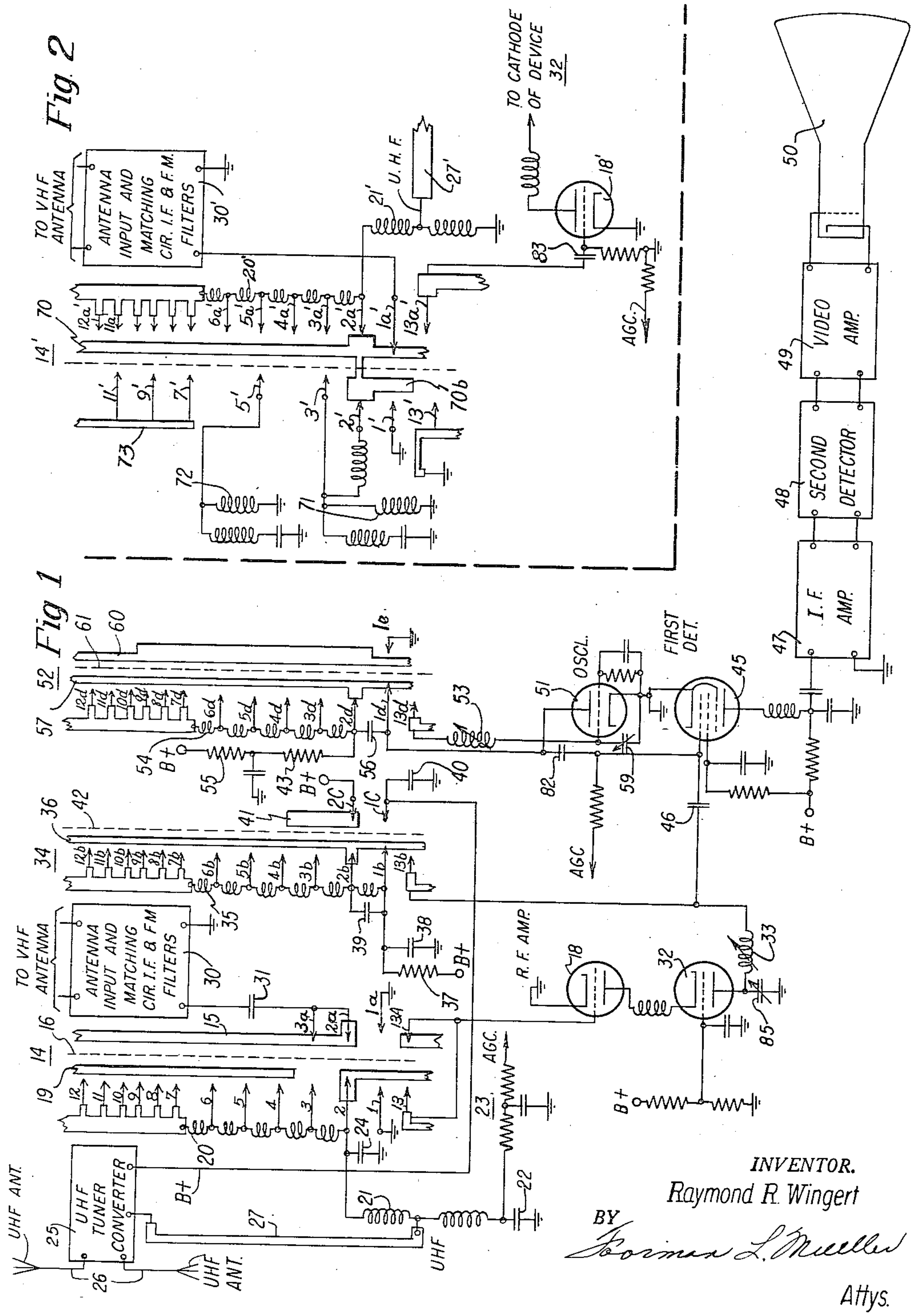

The present invention relates to television receiver tuners and more particularly to an improved television receiver tuner capable of utilizing signals in the very-high and ultra-high frequency band in a simplified and convenient manner.

Present-day television receivers are constructed to utilize television signals located within what is termed the very-high frequency band. The development of television has led to the need for many more television stations than the present very-high frequency band is capable of handling. For this reason, plans have been made to develop a second frequency band higher than the very-high frequency band for television, the second frequency band being designated the ultra-high frequency band.

The development of the ultra-high frequency band has created problems in the design and construction of television receivers capable of utilizing signals in both the very-high and ultra-high frequency bands without the necessity for complicated switching operations on the part of the operator.

The present invention provides an improved television receiver that may be tuned to signals in the very-high frequency band by means of a well known standard station selector which is constructed so that a particular channel selected by the selector conditions the receiver for ultra-high frequency reception, the receiver being equipped with an ultra-high frequency converter which may then be tuned to signals in the ultra-high frequency band.

It is, accordingly, an object of the present invention to provide an improved television receiver which is capable of utilizing signals in the very-high frequency band and which may be simply and conveniently conditioned to utilize signals in the ultra-high frequency band.

Another object of the invention is to provide a television receiver which is constructed for normal operation in the very-high frequency band and which includes an ultra-high frequency converter for conditioning the receiver to utilize signals in the ultra-high frequency band, the converter being energized and connected into the receiver circuit by means of an extremely simple adjustment.

A feature of the invention is the provision of a television receiver which includes a station selector for tuning the receiver to various signals in the very-high frequency band which is constructed so that the ultra-high frequency converter is automatically connected into the receiver circuit for a particular setting of the station selector.

Another feature of the invention is the provision of such an improved television receiver in which the aforementioned ultra-high frequency converter is normally de-energized but is energized when the station selector is tuned to the particular setting in which the receiver is conditioned for ultra-high frequency reception.

Yet another feature of the invention is the provision of such an improved television receiver of the super-heterodyne type in which the ultra-high frequency converter heterodynes the ultra-high frequency signals to the intermediate frequency of the receiver when the latter is conditioned for ultra-high frequency reception, and in which the radio frequency amplifier and the first detector of the receiver is automatically converted to intermediate frequency amplifiers for signals heterodyned by the ultra-high frequency converter.

A still further feature of the invention is the provision of such an improved super-heterodyne television receiver in which the tuning selector is constructed to shunt additional capacity across the heterodyne oscillator of the receiver when the receiver is tuned to certain channels to aid in the fine tuning of the receiver.

The above and other features of the invention which are believed to be new are set forth with particularity in the appended claims. The invention itself, however, together with further objects and advantages thereof, may best be understood by reference to the following description when taken in conjunction with the accompanying drawing in which:

Figure 1 shows a television receiver constructed in accordance with the invention; and Figure 2 shows a modification of a portion of the receiver of Figure 1.

The present invention provides a superheterodyne television receiver for utilizing television signals in a first frequency band and in a second frequency band higher than the first band and in which the signals in the first band are heterodyned to a selected intermediate frequency. The television receiver comprises an antenna circuit for receiving signals in the first frequency band and also includes a converter stage for receiving signals in the second frequency band and for converting said signals to the selected intermediate frequency of the receiver. The receiver also includes an amplifier and inductance means having one side coupled to the amplifier and the other side coupled to the converter and also having a plurality of intermediate taps. A switching mechanism or station selector is provided for connecting the antenna circuit to the amplifier and for successively contacting the taps on the inductance means to vary the effective value of the inductance means, the switching mechanism having a selected operating position for disconnecting the antenna circuit from the amplifier and grounding the antenna circuit and in which the converter is coupled to the amplifier through the inductance means.

The receiver of Figure 1 includes a usual antenna input and high impedance output balun circuit 30 which also includes conventional intermediate frequency and frequency modulation filters. Unit 30 is connected to a very-high frequency antenna and has output terminals connected to ground and coupled through a capacitor 31 to a pair of fixed contacts 2*a* and 3*a* of a first switching mechanism or station selector 14. Switching mechanism 14 and other switching mechanisms to be described herein may be in the form of rotary switches ganged for uni-control. Such switches include a series of fixed contacts arranged in a circle around rotatable annular contact bars. The input circuit to the first stage of the receiver in this embodiment has relatively high impedance; and unit 30 couples the lead-in conductors from the very-high frequency antenna to this input circuit.

Switching mechanism 14 has a first rotatable contact bar 15 which contacts the fixed contacts 2*a* and 3*a*. Contact bar 15 also contacts a further contact 1*a* through a protruding portion of the bar, contact 1*a* being connected to ground. The bar also contacts a contact 13*a* for all positions except when contact is being made with contact 1*a*, contact 13*a* being connected to the control electrode of a radio frequency amplifier electron discharge device 18. Switching mechanism 14 includes a second rotatable contact bar 19 which moves with bar 15 and which contacts fixed contact 2 and has a protruding portion which contacts successively a series of fixed contacts designated as 1 and 3—13 as bar is rotated. Rotatable bars 15 and 19 are supported by and insulated from each other by a plate or disc 16. The receiver includes an inductance means 20 having its sides connected to contacts 2 and 13 and intermediate taps connected to contacts 3—12, contact 1 being connected to ground and contact 13 being further connected to contact **13*a***.

Contact 2 is also connected to one side of an inductance coil 21, the other side of the inductance coil being coupled to ground through a capacitor 22, and the common junction between capacitor 22 and coil 21 being connected to an automatic gain control circuit (not shown) through a usual filter 23. Coil 21 and capacitor 22 are shunted by a capacitor 24.

The receiver also includes an ultra-high frequency tuner-converter 25 having input terminals connected to an ultra-high freqeuncy antenna 26 and having an output terminal connected to a tap on inductance coil 21 through a shielded lead 27.

Discharge device 18 is cascode connected in the usual manner to a further electron discharge device 32. Device 32 has an anode connected through a variable or trimmer inductance coil 33 to a fixed contact **13*b* of a further switching mechanism or selector 34. A variable or trimmer capacitor 85 is connected between the anode of device 32 and ground. Discharge device 32 has a tuned output circuit including an inductance means 35 having one side connected to a fixed contact 1*b* of mechanism 34 and having its other side connected to fixed contact 13*b*. The inductance means has a plurality of intermediate taps respectively connected to fixed contacts 2*b*—12*b* of mechanism 34. Switching mechanism 34 has a rotatable contact bar 36 which contacts with fixed contact 1*b* and has a protruding portion contacting successively with the fixed contacts 1*b*—13*b* as the bar is rotated. Contact bar 36 is mechanically coupled to the contact bars of mechanism 14 for uni-control. Contact 1*b* is also connected to the positive terminal B+ of a source of uni-directional potential through a resistor 37 and is bypassed to ground through a capacitor 38, and contact 2*b* is coupled to contact 1*b* through a capacitor 39**.

Switching mechanism 34 also has a pair of fixed contacts **1*c* and 2*c*; contact 2*c* being connected to the positive terminal B+, and contact 1*c* being connected to ultra-high frequency converter 25 and coupled through a capacitor 40 to ground. Switching mechanism 34 has a second movable contact bar 41 which moves in unison with contact bar 36 and connects contacts 1*c* and 2*c* together when the protruding portion of contact bar 36 connects with contact 1*b*. Rotatable bars 36 and 41 are supported by and insulated from each other by a plate or disc 42**.

Fixed contact **13*b* is coupled to the control electrode of an electron discharge device 45 through a capacitor 46. Discharge device 45 is connected to constitute the mixer or heterodyne converter of the receiver and has an anode coupled to an intermediate frequency amplifier 47 which, in turn, is connected through a second detector 48 to a video amplifier 49. Video amplifier 49 is coupled to the input electrode of a cathode ray image reproducing device 50** to control the intensity of the cathode ray beam therein in well-known manner.

The scanning and sound portions of the television receiver form no part of the present invention and, for that reason, have not been shown.

The receiver also includes an electron discharge device 51 which is connected to constitute the heterodyne oscillator and which supplies a heterodyne signal to the control electrode of device 45 through capacitor 82. The anode of device 51 is connected to a fixed contact **1*d* of a third switching mechanism or selector 52 and the control electrode of device 51 is coupled through an inductance coil 53 to a fixed contact 13d of the last mentioned switching mechanism. The oscillator discharge device 51 has a frequency determining network connected thereto which includes an inductance means 54 having sides connected respectively to contacts 2*d* and 13*d* of mechanism 52 and having a plurality of intermediate taps respectively connected to contacts 3*d*—12*d* of the switching mechanism. The contact 2*d* is also connected to the positive terminal B+ through resistors 43 and 55 and is coupled to contact 1*d* through a capacitor 56. Mechanism 52 has a rotatable contact bar 57 mechanically coupled to the contact bars of mechanisms 14 and 34 for uni-control. Contact bar 57 contacts fixed contact 1*d* and has a protruding portion which successively contacts the fixed contacts 2*d*—13*d*** as the bar is rotated.

Mechanism 52 connects inductance means 54 between the anode and control electrode of device 51, and the inductance means in conjunction with distributed capacity forms a frequency-determining network for the oscillator. Inductance coil 53 is in series between the inductance means and the control electrode of device 51 and forms a fine or trimmer inductive adjustment for the network. A capacitor 59 is connected between the control electrode and cathode of device 51 and constitutes a fine or trimmer capacitive tuning adjustment.

Switching mechanism 52 includes a second contact bar 60 having a protruding portion which makes contact with a fixed contact **1*e* connected to ground when the protruding portion of contact bar 57 contacts certain selected ones of the fixed contacts 1*d*—13*d*. Contact bars 57 and 60 are supported by and insulated from each other by a plate or disc 61. There is a certain capacity between the contact bars, and when contact bar 60 contacts fixed contact 1*e*, a capacity to ground exists from contact bar 57 essentially in shunt with fine-tuning capacitor 59. The capacity range of variable capacitor 59 is then only a part of the total capacity, over and above the stray capacity, involved in the oscillator circuit and its effect on the circuit is decreased. When contact bar 60 is not in contact with contact 1*e*, the capacity of capacitor 59, over and above the stray capacity, is the total capacity involved; therefore, the effective range of the variable capacitor 59 is increased. By forming contact bar 60 to make and break its contact to contact 1*e***, in the proper positions of the switch, a more uniform fine tuner effect is established.

Contact bar 19 of the first switching mechanism 14 has a space between its two ends and has a protruding portion that successively contacts the various fixed contacts 1—13. Fixed contact 2 is extended to connect with contact bar 19 for all positions of the switching mechanism except when the space between the ends of the bar is adjacent thereto. Contact bar 15 of switching mechanism 14 also has a space between its ends and has a protruding portion at one end which connects with contacts **1*a*, 2*a*, 3*a* and 13*a*. The contacts 2*a*, 3*a* and 13*a* are extended to contact with switching bar 15** for all positions of the switch except in the space between its ends.

When the receiver is tuned, for example, to channel 2, the contact bars of the switching mechanisms 14, 34 and 52 are in the position illustrated, with the protruding portion of bar 19 contacting fixed contact 2, with the protruding portion of bar 15 contacting fixed contact **2*a*, with the protruding portion of contact bar 36 contacting contact 2*b*, with bar 41 contacting fixed contact 2*c* only, and with the protruding portion of bar 57 contacting fixed contact 2*d***.

In the operating position of the switching mechanisms referred to above, the unit 30 is coupled to the control electrode of radio frequency amplifier 18 through fixed contacts **2*a* and 3*a*, and through contact bar 15 to fixed contact 13*a* connected to this control electrode. Moreover, the entire inductance means 20 is connected between the control electrode and the top of inductance coil 21 due to the connection from contact 13*a* to 13** and from contact 2 to capacitor 24 and the top of coil 21. Capacitor 24, shunted by inductance coil 21 and capacitor 22, complete the circuit to ground; and the parameters of the circuit, in conjunction with the distributed capacitance thereof, are so chosen that the input circuit of radio frequency amplifier discharge device 18 is tuned to a selected signal in the very-high frequency band.

The last mentioned selected signal is amplified in the radio frequency amplifier, and impressed on the mixer discharge device 45. The output circuit of the radio frequency amplifier is tuned to this selected signal by that portion of inductance means 35 between contact 2*b* and contact 13*b*. That is, the aforementioned portion of inductance means 35 has one side connected to the anode of discharge device 32 through contact 13*b* and has the other side coupled to ground through contact 2*b* contacting the protruding portion of contact bar 36 and through contact 1*b* and capacitor 38. The active portion of inductance means 35 is tuned by the distributed capacity of the circuit to the frequency of the aforesaid selected signal. Ultra-high frequency converter 25 is de-energized for this position since contact bar 41 of switching mechanism 34 is not connected across contacts 1*c* and 2*c* so that no energizing potential is supplied to the converter.

The oscillator discharge device 51 is simultaneously tuned to supply the appropriate heterodyne signal to the discharge device 45 so that the received television signal may be heterodyned to the selected intermediate frequency of the receiver. To achieve this, the entire inductance means 54 is connected between the anode and grid of discharge device 51. That is, one side of inductance means 54 is connected to the anode of discharge device 51 through fixed contact 2*d* contacting the protruding portion of contact bar 57, and through contact 1*d*; and the other side of the inductance means is connected to the control electrode through the fine-tuning inductance coil 53 and contact 13*d*. Inductance means 54 resonates with the distributed capacity of the circuit so that oscillator 51 impresses the appropriate heterodyne signal on mixer 45.

The mixer, therefore, produces an intermediate frequency signal which is amplified by amplifier 47, detected by detector 48, further amplified by video amplifier 49 and impressed on reproducing device 50 in well known manner.

When the receiver is to be tuned to a second signal in the very-high frequency band, tuning mechanisms 14, 34 and 52 are shifted, for example, so that the protruding portions of the various contact bars connect with contacts 3, 3*a*, 3*b* and 3*d*. In this latter position, contact bar 19 effectively short circuits the portion of inductance means 20 between contacts 2 and 3, since contact 3 contacts the protruding portion of the contact bar and contact 2 remains in contact with the contact bar. This inactivates a portion of inductance means 20 and varies the tuning of the input circuit to the radio frequency amplifier so that the second signal is selected and amplified thereby. At the same time, the protruding portion of contact bar 36 of mechanism 34 shorts the portion of inductance means 35 between contacts 3*b* and 1*b*. This varies the tuning of the output circuit of the amplifier to correspond to the frequency of the second signal so that the second signal is selected thereby and supplied to the mixer 45. The frequency of oscillator 51, likewise, is changed so that the proper heterodyne signal is supplied to device 45 to produce the required intermediate frequency signal. The last change is effectuated by the protruding portion of contact bar 57 of mechanism 52 which now contacts contact 3*d* short-circuiting the portion of inductance means 54 between contacts 3*d* and 1*d*. This reduces the active inductive value of the inductance means 54 to change the frequency of the oscillator to the desired value.

In the same manner, the receiver may be tuned to various signals in the very-high frequency band by shifting the switching mechanisms in unison so that the protruding portions of the various contact bars connect with contacts 4—13, 4*b*—13*b* and 4*d*—13*d*. In each instance, the input circuit of the radio frequency amplifier is tuned to the selected signal, as is its output circuit, and the oscillator is tuned to supply the appropriate heterodyne signal in each instance to device 45. For certain of the higher frequency channels, the protruding portion of contact bar 60 connects with contact 1*e* effectively to shunt additional capacity across fine tuner 59 for the reasons stated previously herein.

When it is desired to condition the receiver for ultra-high frequency reception, it is merely necessary to set the tuning mechanisms 14, 34 and 52 to channel 1. When the switching mechanisms are in the latter position, the protruding portion of contact bar 19 connects with contact 1 and is grounded, and extended contact 2 falls in the space between the ends of this contact bar and does not make connection therewith. Contact bar 15 contacts with grounded fixed contact 1*a* and thereby grounds unit 30 from the very-high frequency antenna since contacts 2*a* and 3*a* still make connection with the grounded bar 15. Contact 13*a* falls in the space between the ends of bar 15 so that the control electrode of device 18 is not connected to the bar. The protruding portion of contact bar 36 of mechanism 34 contacts with fixed contact 1*b* so that the entire inductance means 35 is connected into the output circuit of device 32. Contact bar 41 of mechanism 34 is connected across fixed contacts 1*c* and 2*c* so that an energizing potential from B+ is supplied to converter 25. Contact bar 57 of mechanism 52 connects only with fixed contact 1*d* so that the oscillator circuit is disconnected from terminal B+ to disable the oscillator.

The ultra-high frequency converter 25 may now be tuned to a selected signal in the ultra-high frequency band intercepted by ultra-high frequency antenna 26, and such a selected signal is heterodyned to the selected intermediate frequency of the receiver by converter 25. The heterodyne signal is supplied to the aforementioned tap on inductance coil 21 so that the proper impedance matching may be obtained, and is impressed through the upper portion of inductance coil 21 and through inductance means 20 to control electrode of device 18 due to the connection from contacts 13 to 13*a*. Inductance means 20 and its associated distributed capacitance tunes the input circuit of the radio frequency amplifier approximately to the intermediate frequency of the receiver, and inductance coil 21 and associated capacitor 24 provides the additional inductance and capacitance necessary so that the input circuit of device 18 is tuned to the intermediate frequency. The radio frequency amplifier, therefore, selects and amplifies the aforementioned selected signal from converter 25. The entire inductance means 35 including the inductance between contacts 2*b* and 1*b* is included in the output circuit of the radio frequency amplifier and, in conjunction with its associated distributed capacitance, tunes the output circuit of the amplifier to the intermediate frequency. The aforementioned selected signal from converter 25 is, therefore, impressed on mixer 45. As previously pointed out, the heterodyne oscillator discharge device 51 is disabled so that no heterodyne signal is supplied to the mixer. The mixer, under these conditions, functions as an amplifier for the intermediate frequency signal supplied thereto and supplies that signal to intermediate frequency amplifier 47. The signal is further amplified in the intermediate frequency amplifier 47, detected in second detector 48, further amplified in video amplifier 49, and impressed on reproducer 50 for reproduction, as in the case of the very-high frequency signals.

Ultra-high frequency converter 25 may be tuned to various selected signals in the ultra-high frequency band and, in each instance, heterodynes these signals to the intermediate frequency of the receiver and impresses them on the radio frequency amplifier for application to the mixer, intermediate frequency amplifier, and subsequent stages, in the manner previously described.

Figure 2 is a modification of the invention in which elements corresponding to those of Figure 1 are indicated by like numerals primed. In the embodiment of Figure 1, the impedance of the circuitry associated with switching mechanism 14, is substantially that of the control electrode input impedance of device 18, and unit 30 merely provides a slight impedance step-up and a coupling between lead-in conductors from that antenna and the aforementioned circuitry. In the embodiment of Figure 2, on the other hand, the circuitry associated with switching mechanism 14′ has a high impedance portion and a low impedance portion, and unit 30′ matches the moderate impedance of the input from the very-high frequency antenna to the low impedance portion of the aforementioned circuitry. Means is also provided in the embodiment of Figure 2 to match the relatively high input impedance portion with the low impedance portion of the circuitry of mechanism 14′.

In the latter embodiment, the lead from unit 30′ is connected to a fixed contact **1*a*′ which is extended to connect with contact bar 70 of the mechanism 14′ in all positions of the contact bar. The inductance means 20′ of the input circuit of device 18 has a plurality of intermediate taps respectively connected to fixed contacts 2*a*′—13*a*′ of switch 14′, the contact 13*a*′ being coupled to the control electrode of device 18 through a coupling capacitor 83. Contact bar 70 has a protruding portion that makes successive contact with the fixed contacts 2*a*′—13*a*′ as the switch is moved from one operating position to the next. The switch 14′ includes a further series of fixed contacts 1′, 2′, 3′, 5′, 7′, 9′, 11′ and 13′ which make contact with a contact 70*b*. Contact bar 70*b* is connected to contact bar 70 and has a protruding portion. Contacts 3′, 5′, 7′, 9′, 11′ and 13′ are extended to contact the narrow portion or section of contact bar 70*b*. The protruding portion only of bar 70*b* connects with contacts 1′ and 2′. Contacts 2′ and 3′ are connected to ground through an impedance matching network 71. Contact 5′ is connected to ground through an impedance matching network 72, and contacts 7′, 9′, 11′ and 13′ are connected to ground through an impedance matching means 73** which takes the form of a bus bar grounded at one end.

As the receiver is turned, contact arm 70 moves along its fixed contacts, with its protruding portion making successive contact with the contacts **2*a*′—13*a*′ and, in each instance, connecting the lead from unit 30′ to a tap on inductance means 20′ to tune the input circuit to the appropriate signal in the very-high frequency band. When protruding portion contacts, for example, fixed contact 2*a*′; fixed contact 2′ contacts the contact bar 70*b* connecting the matching impedance 71 into the input circuit so that the high impedance input of device 18 is matched with the low impedance output of unit 30′. Similarly, when the switch is moved so that the protruding section of contact bars 70 and 70*b* respectively contact fixed contacts 3′ and 3*a*, the receiver is tuned to a second signal and the same matching impedance 71 is used but the contact with contact 3′ instead of contact 2′ removes the series inductance to contact 2′ to maintain the proper impedance match. For contacts 5*a*′ and 6*a*′, the impedance matching network 72 is used to obtain the proper match for those channels; whereas for contacts 7*a*′—13*a*′, the impedance matching means 73 is used for matching purposes, the impedance changing for every second channel as contact bar 70*b* contacts the fixed contact 7′, 9′, 11′ and 13′**.

When the switching mechanism 14′ is adjusted so that protruding portion of contact bar 70 contacts fixed contact **1*a*′ and protruding portion of contact bar 70*b* contacts the grounded fixed contact 1′, the input circuit is conditioned for reception in the ultra-high frequency band. in the latter position, the lead from units 30′ is grounded through contacts 1*a*′, contact bar 70 and contact 1′, and the ultra-high frequency lead 27′ is coupled (as in the previous embodiment) to the control electrode of device 18′ through the upper portion of inductance coil 21′, through the entire inductance means 20′, and through contact 13*a*′ and capacitor 73**. The remainder of the receiver may be similar to that of Figure 1 and, for that reason, is not shown in detail in Figure 2.

The invention provides, therefore, an improved tuning arrangement for a television receiver which may be either of the high impedance or low impedance type, and which is constructed so that the receiver may be conditioned for reception in the ultra-high frequency band in an extremely simple manner. Moreover, the tuning system of the invention is such that the ultra-high frequency converter of the receiver is energized only when the receiver is conditioned for ultra-high frequency reception, and the heterodyne oscillator of the receiver is simultaneously de-energized under such condition so that the first detector may function as an amplifier for the resulting intermediate frequency ultra-high frequency signal. As an added feature of the invention, the tuning mechanism also provides a means for complementing the fine tuning control on the heterodyne oscillator so that adequate fine adjustment may be achieved in both the high and low portions of the very-high frequency band for all signals to which the receiver may be tuned.

While particular embodiments of the invention have been shown and described, modifications may be made and it is intended in the appended claims to cover all such modifications as fall within the true spirit and scope of the invention.

I claim:

1. A superheterodyne receiver including in combination, an input circuit for receiving signals in a selected frequency band, means for tuning said input circuit to selected signals in such frequency band, a mixer circuit for receiving signals from said input circuit and for converting the received signals to a selected intermediate frequency, an oscillator circuit for supplying a heterodyne signal to said mixer, inductance means included in said oscillator circuit and having a plurality of intermediate taps, a fixed contact connected to a point of reference potential, and a switching mechanism mechanically coupled to said tuning means and including a first contact bar for successively contacting the intermediate taps of said inductance means to vary the frequency of said oscillator and including a second contact bar capacitively coupled to said first contact bar and contacting said fixed contact when said first contact bar contacts selected ones of said intermediate taps on said inductance means.

2. A superheterodyne receiver including in combination, an input circuit for receiving signals in a selected frequency band, means for tuning said input circuit to selected signals in such frequency band, a mixer circuit for receiving signals from said input circuit and for converting the received signals to a selected intermediate frequency, an oscillator circuit for supplying a heterodyne signal to said mixer, inductance means included in said oscillator circuit and having a plurality of intermediate taps, a fine tuning variable capacitor included in said oscillator circuit having one side connected to a point of reference potential, a fixed contact connected to said point of reference potential, and a switching mechanism mechanically coupled to said tuning means and including a first contact bar for successively contacting the intermediate taps of said inductance means to vary the frequency of said oscillator and including a second contact bar capacitively coupled to said first contact bar and contacting said fixed contact when said first contact bar contacts selected ones of said intermediate tap on said inductance means, whereby said contact bars constitute a capacitor effectively in shunt with said fine tuning capacitor for the last mentioned positions of said contact bar.

3. A superheterodyne television receiver for utilizing television signals in a first frequency band and in a second frequency band higher than said first band, and in which the signals in said first and second bands are heterodyned to a selected intermediate frequency, said television receiver including in combination, an antenna circuit for receiving signals in said first frequency band, input terminal means adapted to be connected to a conveter stage which receives signals in the second frequency band and which converts such signals to the intermediate frequency, an amplifier including an electron device having a control electrode, an input circuit for said amplifier including inductance means having first and second end terminals and a plurality of intermediate taps, and a switching mechanism for connecting said antenna circuit to said inductance means and for successively contacting said taps on said inductance means to vary the effective value of said inductance means and tune said input circuit to the frequencies of television signals in the first frequency band, means providing a fixed direct signal connection independent of said switching mechanism extending from said control electrode to said first end terminal of said inductance means through said inductance means and from said second end terminal thereof to said input terminal means, and said switching mechanism having a selected operating position in which said antenna circuit is disconnected from said inductance means and said input circuit is tuned to the intermediate frequency with said input terminal means being coupled to said amplifier through said inductance means.

4. A superheterodyne television receiver in accordance with claim 3 in which said means providing a fixed direct signal connection includes an inductance coil connected between said second end terminal of said inductance means and a reference potential, with said inductance coil having an intermediate tap thereon connected to said input terminal means.

5. A superheterodyne television receiver in accordance with claim 3 including means selectively connected by said switching mechanism for matching the input impedance of said amplifier to the impedance of said antenna circuit as said taps on said inductance means are contacted by said switching mechanism.

References Cited in the file of this patent

UNITED STATES PATENTS

| | | |
|---|---|---|
| 2,513,485 | Herrick | July 4, 1950 |
| 2,665,377 | Krepps | Jan. 5, 1954 |